(12) United States Patent
Chung et al.

(10) Patent No.: US 7,823,280 B2
(45) Date of Patent: Nov. 2, 2010

(54) METHOD FOR MANUFACTURING CONNECTOR OF ELECTRONIC CLUTCH FOR COMPRESSOR

(75) Inventors: Suk-Jae Chung, Daejeon (KR); Sung-Taeg Oh, Daejeon (KR); Dae-Yong Park, Daejeon (KR); Hwa-Yeop Shin, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 38 days.

(21) Appl. No.: 12/270,618

(22) Filed: Nov. 13, 2008

(65) Prior Publication Data
US 2009/0126185 A1 May 21, 2009

(30) Foreign Application Priority Data
Nov. 16, 2007 (KR) ...................... 10-2007-0117073

(51) Int. Cl.
*H01R 43/00* (2006.01)
*H05K 13/00* (2006.01)

(52) U.S. Cl. .............................. 29/856; 29/854; 29/855; 29/858; 29/883; 264/453; 264/478; 264/37.33; 264/465; 439/620.01; 439/620.13; 439/620.33

(58) Field of Classification Search .................. 29/854, 29/855, 856, 857, 858, 883; 264/453, 478, 264/37.37, 465, 37.33; 439/620–622, 620.01, 439/620.04, 620.08, 620.13, 620.26, 620.33
See application file for complete search history.

(56) References Cited

U.S. PATENT DOCUMENTS

| 4,432,446 A | * | 2/1984 | Okano et al. ............ 192/84.961 |
| 5,508,671 A | * | 4/1996 | Takashi ...................... 335/296 |
| 7,138,895 B2 | * | 11/2006 | Chung ......................... 335/299 |
| 2007/0017770 A1 | * | 1/2007 | Oh et al. ................. 192/84.961 |

FOREIGN PATENT DOCUMENTS

| CN | 1900547 A | | 1/2007 |
| JP | 10-318290 | * | 12/1998 |
| JP | 10-318290 A | | 12/1998 |
| JP | 10318290 A | * | 12/1998 |
| WO | WO-2004/067982 A1 | | 8/2004 |

* cited by examiner

*Primary Examiner*—Derris H Banks
*Assistant Examiner*—Jeffrey Carley
(74) *Attorney, Agent, or Firm*—Birch, Stewart, Kolasch & Birch, LLP

(57) ABSTRACT

The present invention relates to a connector of an electromagnetic clutch for a compressor and a manufacturing method thereof. The method includes the steps of arranging a leading end of a lead wire 62 or 72 of at least one discharge device 60 or remaining magnetic field removing device 70, which configures a surge absorbing circuit, to a terminal 50 installed in a connector 30 configuring a field coil assembly and having a coupling slot 56 formed in one side thereof; plastically deforming at least one slot bridge 57 to fix the lead wire 62 or 72 to the coupling slot 56; and making the connector 30 in a state where the terminal 50 is fixed to an assembly of at least the discharge device 60 or remaining magnetic field removing device 70 by injection molding.

1 Claim, 4 Drawing Sheets

METHOD FOR MANUFACTURING CONNECTOR OF ELECTRONIC CLUTCH FOR COMPRESSOR

BACKGROUND OF THE INVENTION

1. Field of the Invention

The present invention relates to an electromagnetic clutch for a compressor, and more particularly, to a method for manufacturing a connector of a field coil assembly provided in an electromagnetic clutch for a compressor.

2. Description of the Related Art

Generally, an electromagnetic clutch for a compressor is an electric device, wherein a magnetic field is formed by electromagnetic induction of a wound coil when power is supplied thereto and a resultant magnetic force causes a hub disc at a driving shaft of a compressor to be attracted toward a frictional surface of a pulley and to be dynamically connected thereto, whereby driving force of the pulley rotated by an engine is transferred to the hub disc of the driving shaft of the compressor.

That is, the electromagnetic clutch for a compressor serves to control the operation of a cooling system of an air conditioner by regulating power of the compressor according to whether or not power is applied to the coil.

FIG. 1 is an exploded perspective view showing a coil assembly of a conventional electromagnetic clutch for a compressor, and FIG. 2 is a plan view showing a major portion of a connector of the conventional electromagnetic clutch for a compressor.

According to the figures, the electromagnetic clutch for a compressor includes a pulley (not shown) connected to a crank shaft of an engine by means of a driving belt (not shown) and having a frictional surface at a side thereof.

Also, the electromagnetic clutch for a compressor is provided with a field coil assembly 1, so that it is contained in the pulley and supported by a housing (not shown) and also generates an attracting magnetic flux by applied power. The attracting magnetic flux generated by the field coil assembly 1 makes a disc (not shown) be coupled to the frictional surface of the pulley, thereby transferring the power of the engine to a driving shaft of the compressor.

An electromagnetic coil is wound in the shape of a ring inside of a body 2 that defines a framework of the field coil assembly 1. A protrusion 3 is provided at one side of the body 2, and a connector mount 5 is coupled to an upper surface of the protrusion 3. Terminal insertion grooves 7 are formed on the connector mount 5, and are portions into which terminals 15 of a connector 10, which will be described later, are inserted.

The connector 10 is coupled to the body 2. The connector 10 receives power from the outside and transfers it into the body 2 through the terminals 15, thereby causing the field coil assembly 1 to form a magnetic field.

An external appearance and framework of the connector 10 is defined by a housing 11. The housing 11 is made of an insulating material such as synthetic resin. A coupling portion 13 for coupling with a counterpart is formed at one side of the housing 11, and the terminals 15 to be coupled and electrically connected to the connector mount 5 is provided at the other side of the housing 11.

At this time, as shown in FIG. 2, electric parts such as a diode D and a resistor R are installed inside of the housing 11. The diode D and the resistor R form a surge absorbing circuit in the connector 10, and are electrically connected to the terminals 15.

A manufacturing process of the connector 10 will be described. First, the terminals 15 are injection molded such that the terminals 15 may be provided integrally with the housing 11. That is, the housing 11 is injection molded while the terminals 15 are inserted in a mold assembly, so that the housing 11 is manufactured as being fixed to the terminals 15.

In such a state, the diode D and the resistor R are inserted into the housing 11. At this time, the diode D and the resistor R are assembled to be connected to one ends of the terminals 15. Then, a thermosetting resin such as epoxy resin E is injected into the housing 11 to fix the diode D and the resistor R.

That is, after injection molding is conducted with the terminals 15 inserted into the housing 11, the diode D and the resistor R are assembled in the housing 11.

However, since an additional process for injecting the epoxy resin E is separately required in a process of assembling the diode D and the resistor R, there is a problem in that the number of processes and production costs for the connector 10 is increased.

In particular, if the diode D and the resistor R are fixed using the epoxy resin E, a time is required for solidifying the epoxy resin E, and thus, there is a problem in that the entire production time for the connector 10 is extended.

In addition, Japanese Laid-open Patent Publication No. 1998-318290 discloses that a surge absorbing device is accommodated in a connector of an electromagnetic clutch. However, before a connector of a power source is coupled to the connector of the clutch, the surge absorbing device or a coupling portion between the surge absorbing device and the terminals are exposed to the outside, which may cause a problem such as bad connection between the terminals and the surge absorbing device due to insertion of foreign substance.

SUMMARY OF THE INVENTION

The present invention is conceived to solve the aforementioned problems in the related art. An object of the present invention is to allow electric parts configuring a surge absorbing circuit and terminals connected thereto to be assembled in a connector through injection molding.

The present invention provides a method for manufacturing a connector of a field coil assembly, in which the field coil assembly is supplied with external power through the connector provided at one side thereof to generate an attracting magnetic flux by a coil wound therein, the method comprising the steps of: arranging a leading end of a lead wire of at least one discharge device or remaining magnetic field removing device configuring a surge absorbing circuit to a coupling slot formed in one side of a terminal provided in the connector; plastically deforming at least one slot bridge to fix the lead wire to the coupling slot; and making the connector in a state where the terminal is fixed to an assembly of at least the discharge device or remaining magnetic field removing device by injection molding.

At least one injection groove may be formed on an outer surface of the connector to prevent the surge absorbing circuit from waving during the injection molding.

BRIEF DESCRIPTION OF THE DRAWINGS

The features and advantages of the present invention will become apparent from the following description of a preferred embodiment given in conjunction with the accompanying drawings, in which.

DESCRIPTION OF THE PREFERRED EMBODIMENT

Hereinafter, a preferred embodiment of a method for manufacturing a connector of an electromagnetic clutch for a compressor according to the present invention will be described in detail with reference to the accompanying drawings.

Figure 1:
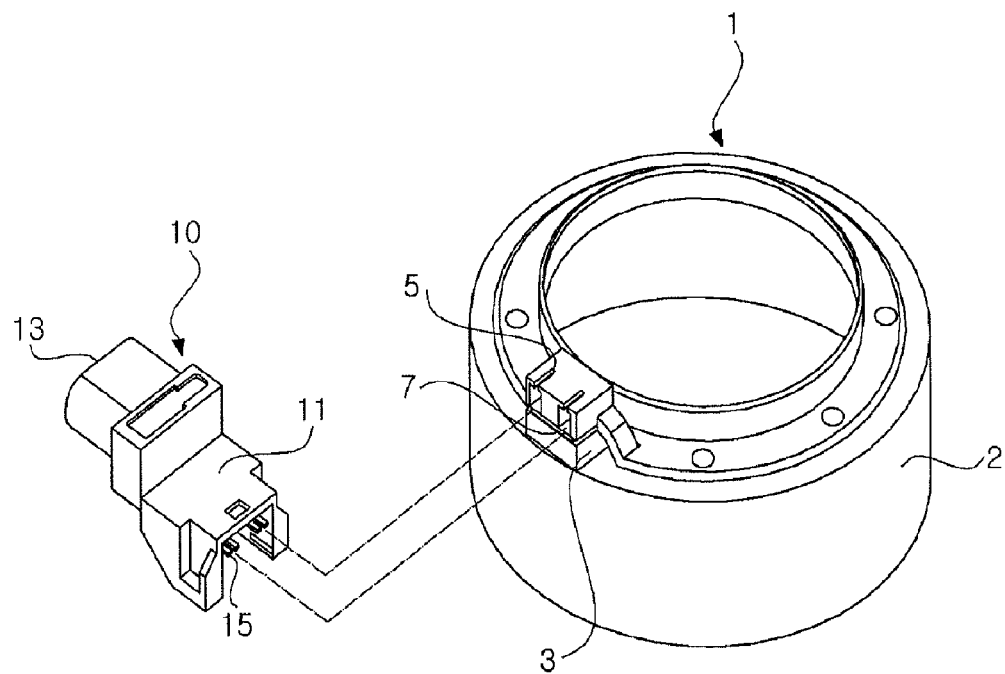
FIG. 1 is an exploded perspective view showing a field coil assembly of a conventional electromagnetic clutch for a compressor.
Figure 2:
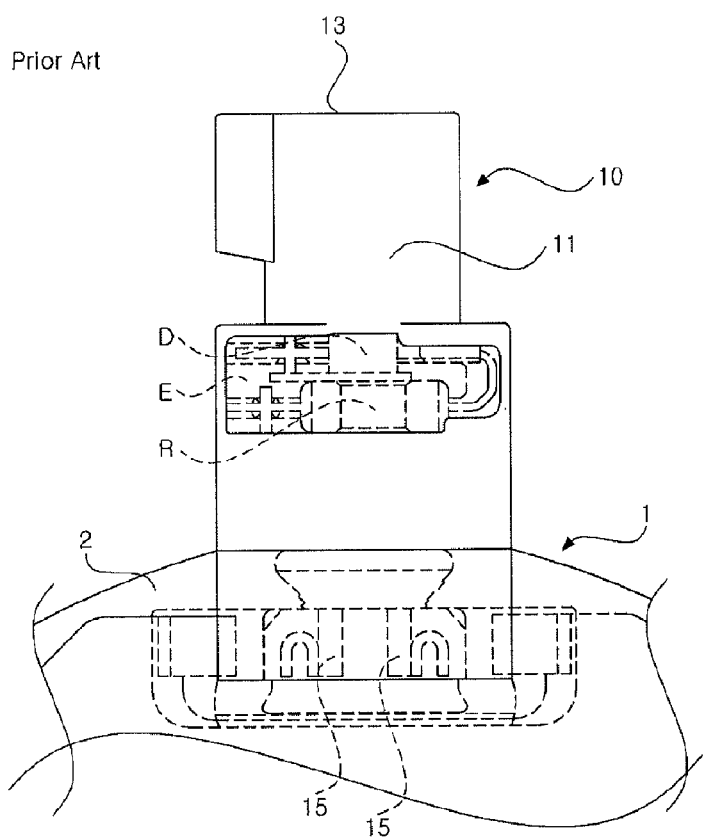
FIG. 2 is a plan view showing a major portion of a connector of the conventional electromagnetic clutch for a compressor.
Figure 3:
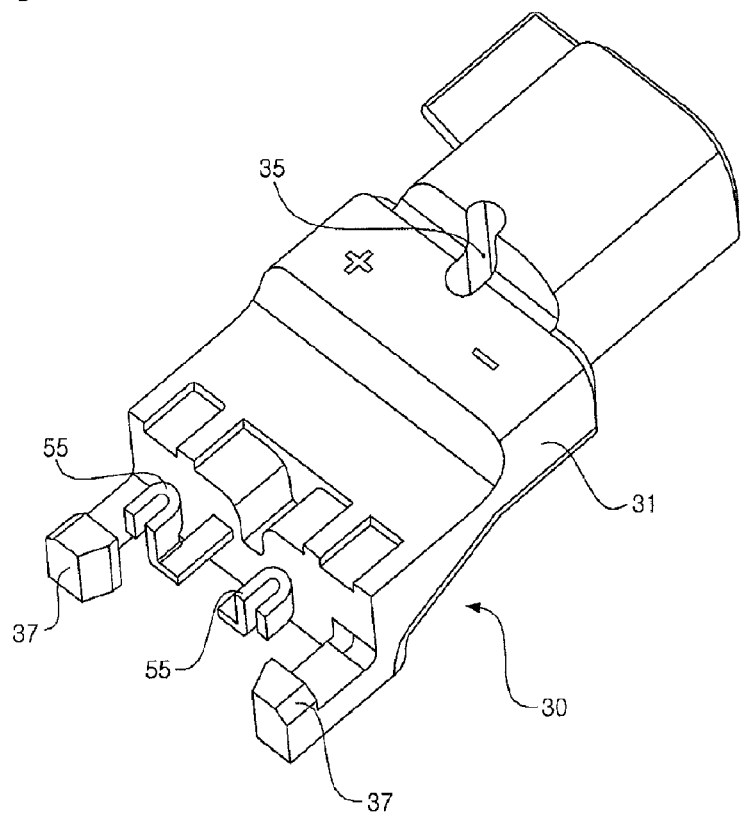
FIG. 3 is a perspective view showing a connector manufactured according to a method for manufacturing a connector of an electromagnetic clutch for a compressor according to the present invention.
Figure 4:
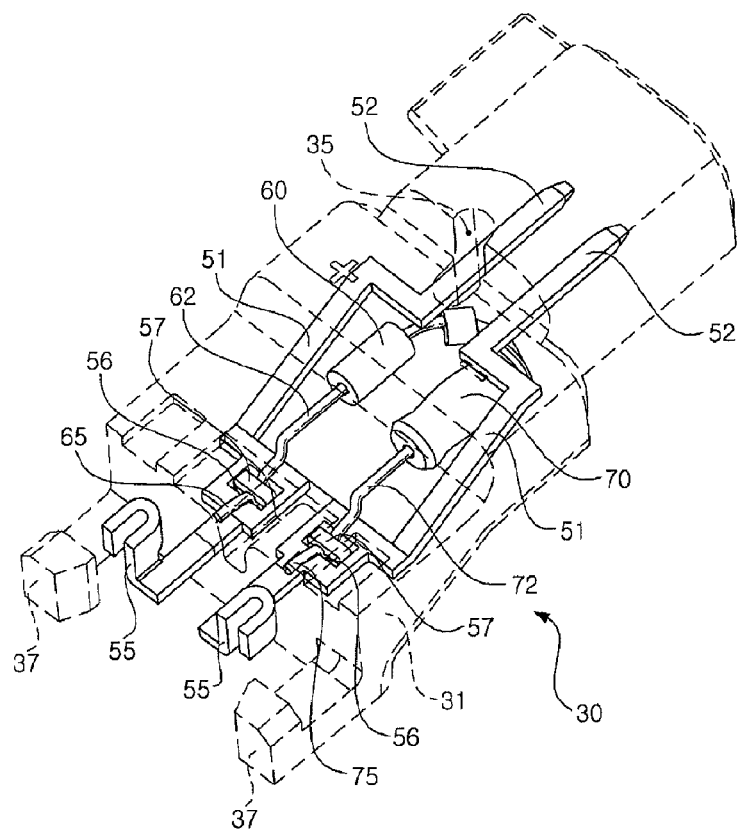
FIG. 4 is an opened-up perspective view showing the interior of the connector of FIG. 3.
Figure 5:
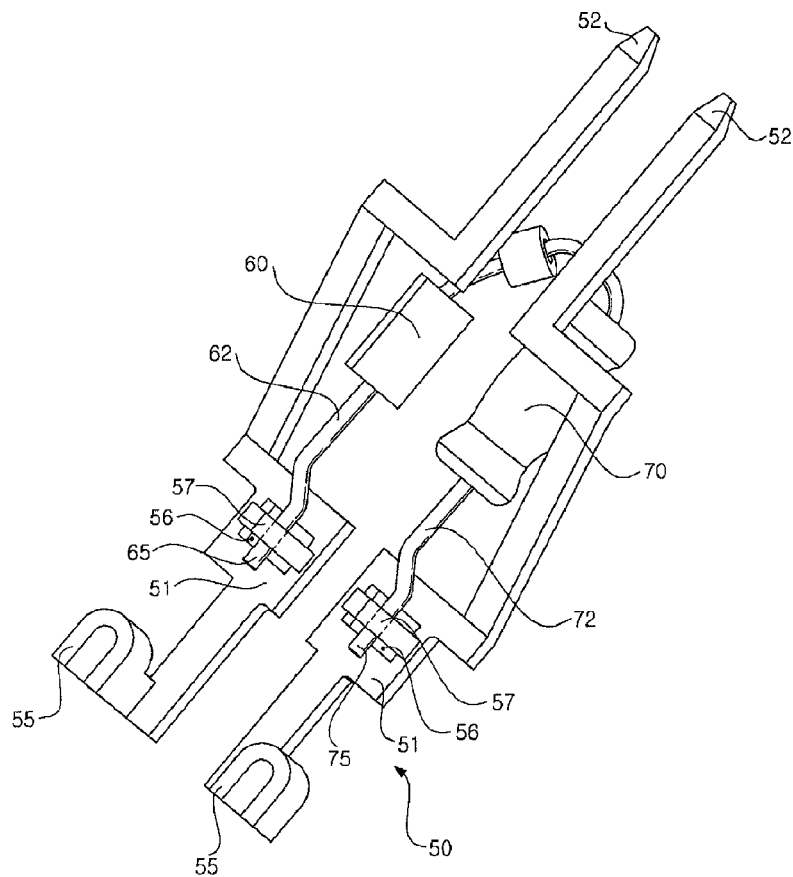
FIG. 5 is a perspective view showing that lead wires of electric parts installed in the connector according to the embodiment of the present invention is arranged in coupling slots of terminals.
Figure 6:
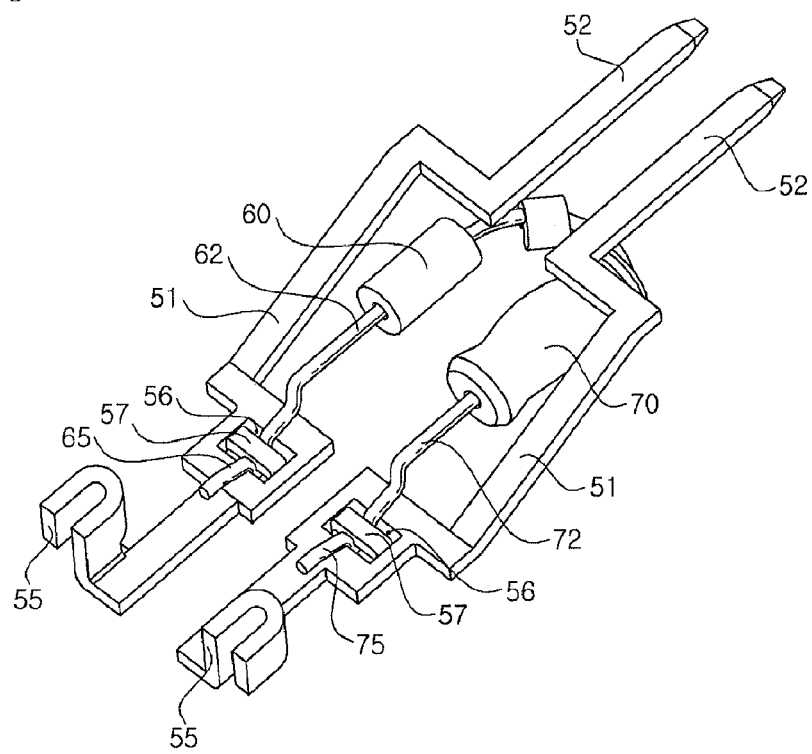
FIG. 6 is a perspective view showing that a slot bridge of the terminals are plastically deformed to fix the lead wires of the electric parts of FIG. 5.
Figure 7:
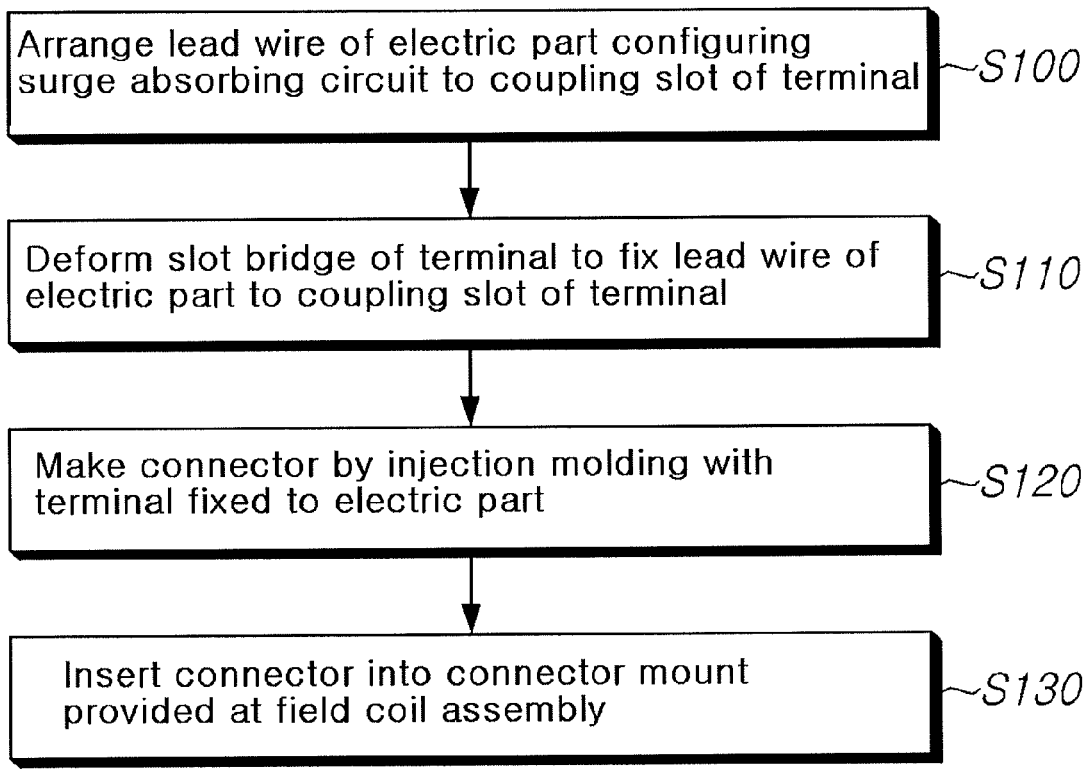
FIG. 7 is a flowchart subsequently illustrating a process of manufacturing a connector of an electromagnetic clutch for a compressor according to an embodiment of the present invention.

FIG. 3 is a perspective view showing a connector manufactured according to the method for manufacturing a connector of an electromagnetic clutch for a compressor according to the present invention, FIG. 4 is an opened-up perspective view showing the interior of the connector of FIG. 3, and FIGS. 5 and 6 are perspective views showing that lead wires of electric parts installed in the connector according to the embodiment of the present invention is arranged in coupling slots of terminals and that a slot bridge of the terminals are plastically deformed to fix the lead wires of the electric parts, respectively. Hereinafter, a body and other components of a field coil assembly refer to the related art, and the following explanation will be focused on the connector manufacturing method.

According to the figures, an external appearance and framework of a connector 30 is defined by a housing 31. The housing 31 is made of an insulating material such as synthetic resin by injection molding.

An injection groove 35 is concavely formed on an outer surface of the housing 31. The injection groove 35 is to prevent electric parts 60 and 70, which are assembled in the housing 31 during an injection process thereof as explained later, from waving. More specifically, an injection mold is provided with a core (not shown) for forming the injection groove 35, so that the positions of the electric parts 60 and 70 may be fixed by means of the core. The injection groove 35 is preferably positioned between a plurality of electric parts 60 and 70.

At this time, although FIG. 3 shows only one injection groove 35, the present invention is not limited thereto. A plurality of injection grooves may be formed on upper and lower surfaces of the housing 31. That is, injection grooves 35 may be formed corresponding to the electric parts 60 and 70 in number and position. Of course, no injection groove 35 may be formed in the housing 31.

Fixing protrusions 37 are provided on one side of the housing 31. The fixing protrusions 37 are to fix the connector 30 to a body 2 of a field coil assembly 1. To this end, the fixing protrusions 37 are provided in a pair at a rear end of the housing 31 as shown in the figures.

As shown in FIG. 5, terminals 50 are provided inside of the housing 31. The terminals 50 are to transmit external power to a coil wound in the field coil assembly 1, and are made of a metal material with good electric conductivity. The terminals 50 come into contact with terminals of an opposite connector (not shown) connected to the external power and is electrically connected thereto, thereby transmitting the external power to the field coil assembly 1. To this end, the terminals 50 should be installed such that at least portion thereof is exposed to the outside of the housing 31. In this embodiment, the terminals 50 are provided in a pair in the housing 31.

A framework of the terminal 50 is defined by a bar-shaped body 51, and both ends 52 and 55 of the body 51 are respectively connected to an opposite connector (not shown) and a connector mount 5 of the field coil assembly 1.

At this time, the body 51 of the terminal 50 is formed with a coupling slot 56. The coupling slot 56 is formed by partially cutting the body 51, and is a portion to which a lead wire 62 or 72 of the electric part 60 or 70, which will be described later, is coupled. In this embodiment, the coupling slot 56 is formed to pass through a part of the body 51, but not limited thereto. That is, a part of the body 51 corresponding to one side of the coupling slot 56 may be cut such that one end of the coupling slot 56 communicates with the outside.

A slot bridge 57 is provided at one side of the coupling slot 56. The slot bridge 57 is formed while the coupling slot 56 is formed by cutting, and is provided across the coupling slot 56. That is, a predetermined space is formed between the coupling slot 56 and the slot bridge 57 such that the lead wire 62 or 72 of the electric part 60 or 70 may pass therethrough.

At this time, there may be provided a plurality of coupling slots 56 and slot bridges 57. That is, though there are provided only one coupling slot 56 and only one slot bridge 57 in this embodiment, the present invention is not limited thereto. More specifically, a plurality of coupling slots 56 and slot bridges 57 may be formed in the body 51 of the terminal 50 along a direction in which the lead wire 62 or 72 of the electric part 60 or 70 is arranged. In this case, the lead wire 62 or 72 of the electric part 60 or 70 is fixed to the plurality of coupling slots 56, so that the terminal 50 may be more stably coupled to the electric part 60 or 70.

Alternatively, slot bridges 57 may be provided in a pair to face each other in the body 51 of the terminal, and the lead wire 62 or 72 of the electric part 60 or 70 may be bent such that the slot bridges 57 approach each other while the lead wire 62 or 72 is inserted between the pair of slot bridges 57, thereby making the lead wire 62 or 72 be compressed between the slot bridges 57.

The electric parts 60 and 70 are electrically connected to the terminals 50. The electric parts 60 and 70 are to configure a surge absorbing circuit to the connector 30, and are composed of a discharge device 60 and a remaining magnetic field removing device 70. In this embodiment, the discharge device 60 and the remaining magnetic field removing device 70 respectively comprise a diode 60 and a resistor 70, but the present invention is not limited thereto. Also, the surge absorbing circuit may be composed of only a diode 60. The diode 60 and the resistor 70 are electrically connected to the terminals 50 provided in a pair.

As shown in FIGS. 5 and 6, the diode 60 is provided with a lead wire 62. The lead wire 62 is to electrically connect to one of the terminals 50, and is formed to extend in one side.

More specifically, a leading end 65 of the lead wire 62 is fixed to the coupling slot 56 by means of the slot bridge 57 of the terminal 50, so that the diode 60 is electrically connected to the terminal 50.

The resistor 70 is also provided with a lead wire 72, like the diode 60. The lead wire 72 is to electrically connect to the other of the terminals 50, and is formed to extend in one side. In specifically, a leading end 75 of the lead wire 72 is fixed to the coupling slot 56 by means of the slot bridge 57 of the terminal 50, so that the resistor 70 is electrically connected to the terminal 50.

At this time, the coupling between the terminal 50 and the electric part 60 or 70 is not limited to the configuration of the coupling slot 56 and the slot bridge 57. For example, the lead wire 62 or 72 of the electric part 60 or 70 may pass through a coupling hole (not shown), which is bored through a part of the terminal 50, and then, may be bent such that the terminal 50 is electrically connected to the electric part 60 or 70.

Alternatively, the lead wire 62 or 72 of the electric part 60 or 70 may also be fixed to the terminal 50 by soldering or insulating tape.

Hereinafter, a method for manufacturing a connector of an electromagnetic clutch for a compressor according to the present invention will be described.

First, before the housing 31 is injection molded, the terminals 50 are coupled with the electric parts 60 and 70 that configure a surge absorbing circuit. That is, the terminals 50 are electrically connected to the surge absorbing circuit.

More specifically, the lead wires 62 and 72 of the diode 60 and the resistor 70 are respectively arranged to the coupling slots 56 of the terminals 50. This configuration is shown in FIG. 5. In a case where a plurality of coupling slots 56 are formed, each of the lead wires 62 and 72 is arranged across a plurality of the coupling slots 56 (S100).

In this state, the slot bridge 57 of the terminal 50 is pressed toward the lead wire 62 or 72 to be plastically deformed. At this time, the process of deforming the slot bridge 57 may be conducted using a press die. If the slot bridge 57 is pressed and plastically deformed as mentioned above, the lead wire 62 or 72 is compressed between the slot bridge 57 and the coupling slot 56, thereby being firmly fixed (SI 10). This state is shown in FIG. 6.

As explained above, the lead wires 62 and 72 may also be fixed to the terminals 50 by soldering or the like.

Next, the terminals 50 and the assembly of the diode 60 and the resistor 70 are positioned in an injection mold, and then, the housing 31 is made by injection molding. More specifically, the terminals 50 and the assembly of the electric parts 60 and 70 that configure the surge absorbing circuit are positioned in a cavity of a mold assembly used for forming the housing 31, and then, a molten resin is injected thereinto to make the connector 30 (S120).

At this time, since the injection groove 35 is formed in the housing 31, the diode 60 and the resistor 70 may be fixed at accurate positions in the housing 31 while the resin is injected and flows in the cavity.

In this state, the terminals 50 and the assembly of the diode 60 and the resistor 70 are fixed together with the housing 31, thereby being integrally assembled. Thus, there is no need of a separate process for injecting a thermosetting resin in order to fix the diode 60 and the resistor 70 in the housing 31.

In addition, in a process where the connector 30 is made by injection molding, the coupling portions between the terminals 50 and the electric parts 60 and 70 are naturally shielded, so that foreign substance can be prevented from being introduced between the terminals 50 and the electric parts 60 and 70.

Finally, the connector 30 manufactured as above is connected to the connector mount 5 provided in the body 2 of the field coil assembly 1. That is, the leading ends of the terminals 50 are inserted into terminal insertion grooves 7 formed in the connector mount 5, so that the connector 30 is electrically connected to the body 2 of the field coil assembly 1 (S130).

The scope of the present invention is not limited to the embodiment described and illustrated above but is defined by the appended claims. It will be apparent that those skilled in the art can make various modifications and changes thereto within the scope of the invention defined by the claims.

In the present invention, a surge absorbing circuit is assembled in a connector, which configures an electromagnetic clutch for a compressor, by injection molding. Accordingly, there is no need of a separate process for injecting a thermosetting resin so as to fix the surge absorbing circuit in the connector, thereby decreasing the number of processes for assembling a connector and also reducing a production cost.

Also, during the process of manufacturing a connector, there is no need of a time required for solidifying a thermosetting resin, thereby decreasing a time required for manufacturing a connector.

In addition, since a space between the terminals and the surge absorbing circuit installed to the connector is naturally shielded during the injection molding, thereby preventing foreign substance from being introduced, the improved operation reliability of the connector can also be expected.

What is claimed is:

1. A method for manufacturing a connector of an electromagnetic clutch for a compressor, in which the electromagnetic clutch includes a field coil assembly being supplied with external power through the connector provided at one side thereof to generate an attracting magnetic flux by a coil wound therein, the method comprising the steps of:

arranging a leading end of a lead wire of at least one discharge device or remaining magnetic field removing device configuring a surge absorbing circuit to a coupling slot formed in one side of a terminal provided in the connector;

plastically deforming at least one slot bridge to fix the lead wire to the coupling slot; and making the connector in a state where the terminal is fixed to an assembly of at least the discharge device or remaining magnetic field removing device by injection molding, wherein at least one injection groove is formed on an outer surface of the connector to prevent the surge absorbing circuit from waving during the injection molding.

* * * * *